(12) United States Patent
Wollner

(10) Patent No.: US 6,473,661 B1
(45) Date of Patent: Oct. 29, 2002

(54) HOME AUTOMATION SYSTEM

(75) Inventor: Peter Wollner, Baltimore, MD (US)

(73) Assignee: Auto Time, LLC, Brooklyn, NY (US)

( * ) Notice: Subject to any disclaimer, the term of this patent is extended or adjusted under 35 U.S.C. 154(b) by 0 days.

(21) Appl. No.: 09/526,308

(22) Filed: Mar. 15, 2000

(51) Int. Cl.$^7$ ............................................... G05B 15/00
(52) U.S. Cl. ............................ 700/83; 700/19; 700/17; 700/65
(58) Field of Search ............................ 700/17, 19, 65, 700/83

(56) References Cited

U.S. PATENT DOCUMENTS 5,086,385 A * 2/1992 Launey et al. ................. 700/83

* cited by examiner

Primary Examiner—Thomas Black
Assistant Examiner—Ronald D Hartman, Jr.
(74) Attorney, Agent, or Firm—Kapan & Gilman, LLP

(57) ABSTRACT

A home automation system for automatically controlling the electric lights and appliances in a Jewish family's home or Jewish institution. The system is preset to generate a regular schedules for Shabbos and Jewish Holidays based on the Jewish calendar and may also generate regular weekday scheduled events. Special schedules such as vacation mode, guest mode, summer mode and the like may be added and adjusted by the user as well. The special schedules or modes may be manually activated by a mechanical device outside the computer. Updated schedules are reported to a remotely located monitoring system. Some rooms may be bypassed by the regular schedule if desired. Power fail recovery and automatic atomic clock synchronization are also provided in the system.

14 Claims, 2 Drawing Sheets

| | | | |
|---|---|---|---|
| Time It Right | | | X |

Time It Right
Registered to: Registry Name  Serial Number: 34003099

| | | | |
|---|---|---|---|
| Update Schedule | F1 | F2 | Print Current Schedule |
| Adjust Vacation Schedule | F3 | F4 | Vacation On |
| Adjust Early Mincha Schedule | F5 | F6 | Party On |
| Adjust Summer Schedule | F7 | F8 | Run Sprinkler System |
| Adjust Winter Schedule | F9 | F10 | |
| | F11 | F12 | |

HOME AUTOMATION SYSTEM

TECHNICAL FIELD OF THE INVENTION

This invention relates to a computer-controlled automation system, in particular to a home automation system, which can turn on or off numerous electric devices in a home according to a schedule preset according to religious activities.

BACKGROUND OF THE INVENTION

For the observant Jew, it is forbidden by Jewish law to turn on or off lights and appliances on Shabbos (the Jewish Sabbath which starts at Sundown Friday and ends Saturday night) and Yom Tov (Jewish Holidays, which occur throughout the year based on the Jewish calendar). While some people simply leave these lights and appliances on or off the entire Shabbos or Yom Tov, many observant Jews choose to use some type of automatic timing device to turn these lights and appliances on and off at preset times. Consequently, one of the big "little" jobs that most people leave for the last minute before Shabbos or Yom Tov is setting their Shabbos clocks or timers, which control such appliances as their lights, air conditioners, the crock pot, and, on Yom Tov, their ovens or stoves. Friday, so the old saying goes, "is a short day," with seemingly a million things to do to get ready for Shabbos.

Previously, a mechanical timer with a little clock dial for each separate lamp, crock pot, or other electrical appliance was used to turn all of these devices on and off. The difficulty in maintaining the schedule for these clocks is due to two factors. First, Shabbos, as well as Yom Tov, starts at Sundown. Second, the Jewish calendar is based on the lunar cycle and, therefore, Jewish Holidays come out on different English dates as well as different days of the week. Consequently, schedules are constantly changing and the time clocks always have to be reset and adjusted.

Eventually, home automation systems were developed which allowed centralized scheduling of the various lights and appliances in the home either using a timed controller or a computer. On/off command signals are sent out to control each appliance via the home wiring system. However, all of these systems have two major drawbacks as they relate to scheduling for Shabbos and Yom Tov. First, they are based on the English calendar, and second, schedules still had to be adjusted manually since the times would change from week to week.

All these problems were solved in a home automation system produced by the same inventor of this application in which Torah and technology were combined. The schedule for turning on/off of all the electrical devices is generated according to Jewish calendar and Jewish religious activities combined with the particular life style of the family. The system automatically generates a new schedule weekly and knows when Jewish Holidays are coming and generates the appropriate schedule for them. The user does not have to make any adjustments from week to week. The automation system, however, does allow the user to set special schedules for particular activities to override the regular schedule so that individual needs might be considered and flexibly incorporated. However, the automation system still needs some improvements.

SUMMARY OF THE INVENTION

The present invention is directed to improving the above home automation system.

According to the present invention, a home automation system comprises a plurality of switches for turning on/off each of the devices, a computer having means for generating a regular schedule of an on/off time for each of the devices and means for generating a special schedule of an on/off time for at least one of the devices. A user interface or a mechanical means is provided for manually selecting between the regular schedule and special schedules for the devices. The switches are automatically activated according to the selected schedule.

The regular schedule is set according to Jewish calendar and rules on Jewish religious activities while the special schedule may be set according to length of day time in different seasons or according to needs of the user for some particular activities.

The regular schedule and special schedules may be updated at a preset interval and the updated schedules may be reported to a monitoring system remotely located from the home.

The system may further comprise means for automatically synchronizing the clock in the computer with the National Bureau of Standards atomic clock.

The features and advantages of the present invention may be clearer from the following detailed description in reference to the accompanying drawings in which:

DETAILED DESCRIPTION OF THE INVENTION

As required by Jewish religious rules, electric lights and other appliances are not allowed to be manually turned on or off on Shabbos or Jewish Holidays. This makes it a big inconvenience to the observant Jew since there are so many lights and other electric appliances which need to be used on these days in the typical Jewish home. A home automation system that is capable of automatically scheduling the control of these lights and appliances in accordance with Jewish law is in high demand.

The development of computer technology makes it possible for a typical family, with the help of a particular program running on a personal computer, to automatically control all these lights and electrical appliances for every scheduled holiday or religious activity. The schedule shall be set by the Jewish calendar, which is very different from a regular calendar. The on/off commands may be sent to each of plural switches through the existing electrical wires in the home using X-10 technology.

The home automation system of the present invention comprises a personal computer on which an automation program is running to control the electric lights and appliances in the home on a preset schedule. The program is written using the Visual Studio VC 6.0 and compiled into a Windows executable file.

Figure 1:
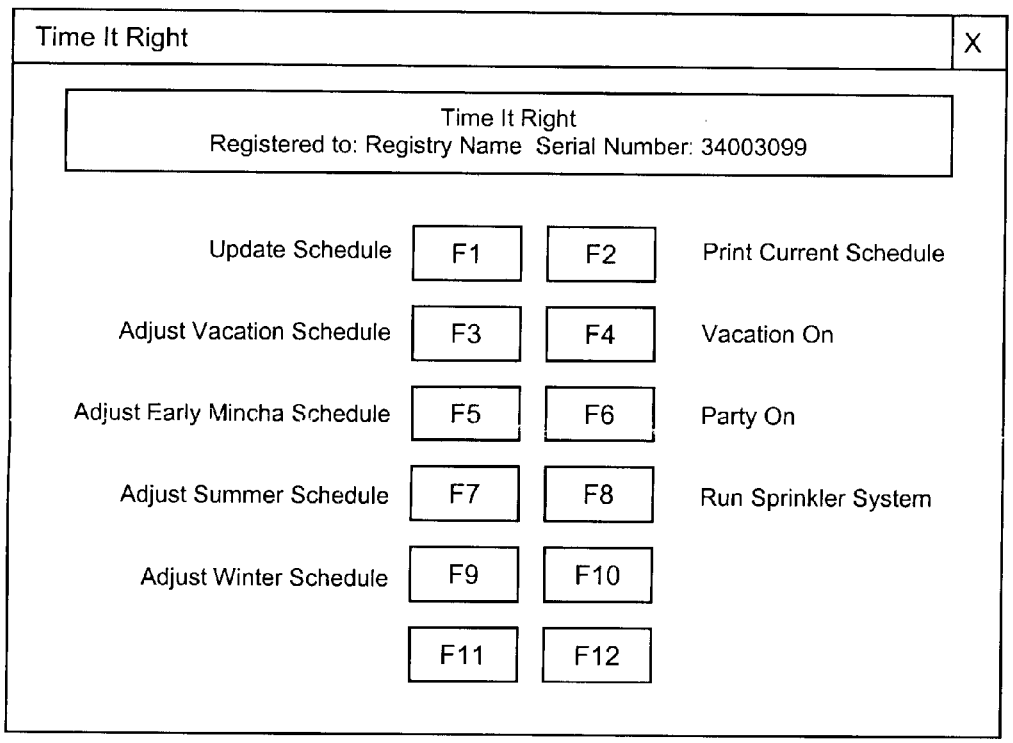
FIG. 1 is an interface showing the selection button for producing schedules.

The screen layout of the program is shown in FIG. 1. A box located near the top of the dialog will display the name of the program (e.g., Time It Right), perhaps a logo, along with other information such as a copyright message, the users name, the serial number, etc. This information may be gathered at the time of installation and stored in the registry.

Up to 12 function keys (F1–F12) are displayed in the window. Odd function keys on the left, even on the right. Either way, the above arrangement of F-key buttons gives a nice balanced look. Of course, other arrangements are also acceptable. Buttons, such as F10–F12, that are undefined or have no associated actions are disabled. When the user presses a function key, an associated executable will be called to run.

The program controls the electrical lights and appliances following a preset "regular schedule". This schedule is customized for each family and is based on the Jewish calendar, Jewish law, and family preferences and lifestyle. The schedule adjusts itself week after week and year after year without any human intervention. After the schedule is preset into the computer, the user may "forget it" since the lights and appliances will be automatically turned on or off at every scheduled time.

There is also a need for some schedules other than the regular schedule to be preset or added into the system. For example, the user may want to turn on air conditioners or deck lights only in the summer. Another example might be earlier times for lights out in the winter because people go to bed earlier. Consequently, the user may hope to have special summer and winter modes to accommodate his needs. As shown in FIG. 1, F7 is used to input summer dates and F9 is used to input winter dates. Events which are scheduled to occur only during "summer" or "winter" will only occur between these dates. While the scheduling flexibility offered by such modes is important everywhere, it is especially useful in a geographically remote location, such as in Alaska, where the day time is very short during winter, and in some tropical countries where the day time is very long in the summer.

Other special schedules may also be considered to be included in the system. For example, F5 is used to adjust an Early Mincha Schedule when a user starts Shabbos Friday afternoon earlier than sunset and lights are controlled accordingly. Night/Day Simcha mode allows for special scheduling if there is some special party in the house Friday night or Saturday afternoon. For example, for a Friday night party, the user may want all lights for the first floor to stay on very late instead of following the regular schedule.

Guest Mode may also be included, as controlled by key F6. When F6 is pressed, the guest mode schedules are activated in guest rooms and in certain areas where the guests are present, so that the lights in these areas will operate on schedule. When guest mode is off, the schedule for these lights is skipped since no one is there.

Key F3 is used to adjust vacation schedule when the user has gone on for vacation. Under the vacation mode, outdoor lights retain their regular schedule and certain indoor lights maintain a random schedule to create the illusion that someone is in the house. On Friday nights, the doorway lights and landscape lighting can be programmed to go on and off at different times than during the rest of the week.

Figure 2:
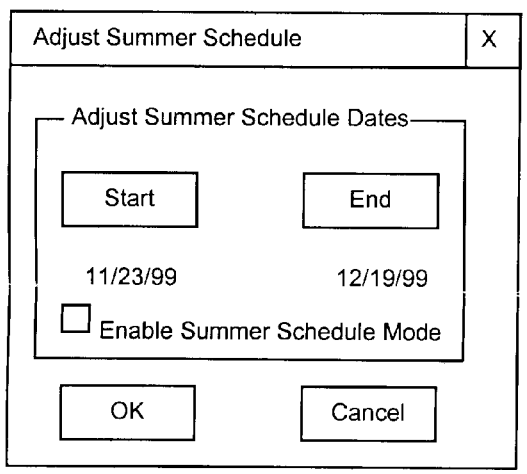
FIG. 2 is an interface for adjusting a summer schedule.
Figure 3:
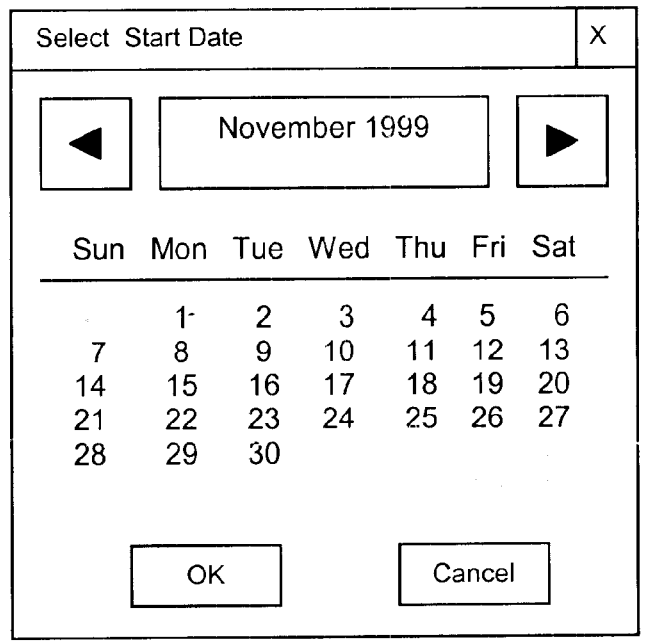
FIG. 3 is an interface for selecting a start date.

When the vacation schedule is activated by pressing key F4, the regular schedule will be bypassed and the system will control the home lights and appliances solely on the vacation mode. In a preferred embodiment, the vacation mode is not activated by pressing the key F4 on the screen of the computer, but is manually activated or deactivated by the user through a device outside the computer, e.g., a control panel or keypad fixed on the wall with command buttons to activate various modes. By pushing a button on the control panel, the user may select between the regular schedule and the vacation schedule or other modes. Schedules may be adjusted through a dialog window as shown in FIG. 2, in which the summer schedule is taken as an example. The user may input the start ate and end date for the summer schedule and then hit an "ok" key to activate the summer schedule. During the summer schedule as defined and activated by the user, the regular schedule will be bypassed. The start date and the end date may be conveniently input using a dialog as shown in FIG. 3.

Figure 4:
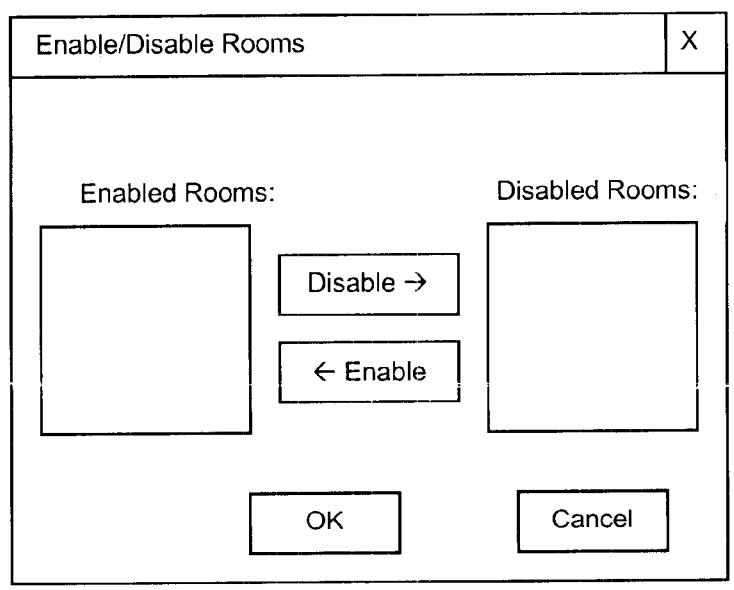
FIG. 4 is an interface for bypassing some of the rooms.

In a further preferred embodiment, some rooms may be bypassed by the regular schedule. For example, a child who is away at school and only comes home occasionally can have his room bypassed when he is not home or perhaps a basement play area that is not regularly used can easily be activated or bypassed as necessary. A dialog window as shown in FIG. 4 may be used to enable or disable the rooms that may be bypassed. The rooms listed in the left box are enabled rooms and may be moved into the right box as disabled rooms by the "disabled" button, or vise versa. The "ok" button activates the selection.

The home automation system will log all scheduling activities and notify a monitoring system accordingly. The monitoring system is run by the service provider of the system and may be remotely located from the home. The schedules may be updated at predetermined intervals on the users computer and verification that the schedule has updated is sent to the monitoring system on a regular time basis, e.g., every three days, or each time when the schedules are changed. The communication between the monitoring system and the home automation system may be implemented via modem or fax. This monitoring system may ensure that the automation system is running properly and updating itself regularly.

In a further preferred embodiment, the internal clock of the computer is automatically synchronized to the National Bureau of Standards atomic clock in Boulder Colo. This may ensure that the automation system is running precisely on schedule.

The home automation system preferably includes a power fail recovery device so that in the event of a power failure, the system will restore all devices to the state that they are supposed to be at, either on or off, at the time of power restoration.

From the foregoing, it will be observed that numerous variations and modifications may be effected without departing from the true spirit and scope of the novel concept of the invention. It is intended to cover by the appended claims all such modifications as fall within the scope of the claims.

What is claimed:

1. A home automation system for automatically controlling electric devices in a home, comprising:

a plurality of switches for turning on/off each of said devices;

a computer having means for generating a regular schedule and special schedules of an on/off time for each of said devices;

means for automatically activating said switches according to either of said regular schedule or special schedules; and a control panel for manually selecting between said regular schedule and said special schedules so that said activating means operates according to said selected schedule;

wherein said regular schedule is set according to the Jewish calendar, rules on Jewish religious activities and family preferences and lifestyle.

2. The home automation system of claim 1 wherein said special schedule is set for vacation days when home members are out for vacation.

3. The home automation system of claim 2 wherein said special schedule is set as such that a non-vacation situation is emulated by turning on/off said electric devices following said special schedule.

4. The home automation system of claim 1 wherein said special schedule is set according to different daytime lengths.

5. The home automation system of claim 4 wherein said special schedule includes a summer mode and a winter mode.

6. The home automation system of claim 4 wherein said special schedule includes an early Mincha mode.

7. The home automation system of claim 4 wherein said special schedule includes a night Simcha mode and a day Simcha mode.

8. The home automation system of claim 1 wherein said special schedule includes a guest mode.

9. The home automation system of claim 1 further comprising means for updating said schedules in a predetermined interval.

10. The home automation system of claim 9 further comprising means for reporting said updated schedules to a remotely located monitoring system after each updating.

11. The home automation system of claim 1 further comprising means for automatically synchronizing a timing clock in said computer with an atomic clock.

12. The home automation system as described in claim 1, further comprising a power failure recovery device for restoring the system to a scheduled state as of the time of power restoration with each of the electric devices either on or off as is appropriate.

13. A home automation system for automatically controlling electric devices in a home, comprising:

a plurality of switches for turning on/off each of said devices;

a computer having means for generating a regular schedule and a vacation schedule of an on/off time for each of said devices according to the Jewish calendar;

means for automatically activating said switches according to either of said regular schedule or vacation schedule; and a mechanical device for manually selecting between said regular schedule and said vacation schedule so that said activating means operates according to said selected schedule.

14. The home automation system as described in claim 13, further comprising a power failure recovery device for restoring the system to a scheduled state as of the time of power restoration with each of the electric devices either on or off as is appropriate.

* * * * *

UNITED STATES PATENT AND TRADEMARK OFFICE
CERTIFICATE OF CORRECTION

PATENT NO.    : 6,473,661 B1
DATED         : October 29, 2002
INVENTOR(S)   : Peter Wollner It is certified that error appears in the above-identified patent and that said Letters Patent is hereby corrected as shown below:

<u>Title page,</u>
Item [73], please correct "Auto Time, LLC, Brooklyn, NY (US)" to read
-- AutoTime, LLC, Baltimore, MD (US) --

Signed and Sealed this

Twenty-ninth Day of July, 2003

JAMES E. ROGAN
*Director of the United States Patent and Trademark Office*